United States Patent

[11] 3,569,710

| [72] | Inventor | Antony Jalink, Jr.<br>Newport News, Va. |
|---|---|---|
| [21] | Appl. No. | 764,252 |
| [22] | Filed | Oct. 1, 1968 |
| [45] | Patented | Mar. 9, 1971 |
| [73] | Assignee | The United States of America as represented by the Administration of the National Aeronautics and Space Administration |

[54] METHOD FOR IMPROVING THE SIGNAL-TO-NOISE RATIO OF THE WHEATSTONE BRIDGE TYPE BOLOMETER
1 Claim, 1 Drawing Fig.

| [52] | U.S. Cl. | 250/83.3, 250/43.5, 340/233, 340/285 |
|---|---|---|
| [51] | Int. Cl. | G01j 5/24 |
| [50] | Field of Search | 250/83.3 (IR), 83.3, 43.5; 73/355, 88.5; 320/375; 324/65B; 340/233, 285 |

[56] References Cited
UNITED STATES PATENTS

| 3,194,962 | 7/1965 | Carlson et al. | 250/83.3I |
| 3,286,524 | 11/1966 | Malone | 250/83.3I |
| 3,418,478 | 12/1968 | Falbel | 250/83.3I |

*Primary Examiner*—James W. Lawrence
*Assistant Examiner*—Morton J. Frome
*Attorneys*—Howard J. Osborn, William H. King and G. T. McCoy

ABSTRACT: An improvement in the signal-to-noise ratio of a Wheatstone bridge type radiation measuring instrument. The improvement consists of replacing the shielded element in the bridge by an identical element except that it is K times as large and has K times as much resistance and replacing the voltage source adjacent to the replaced element by a power source producing K times as many volts where K is greater than one.

PATENTED MAR 9 1971 3,569,710
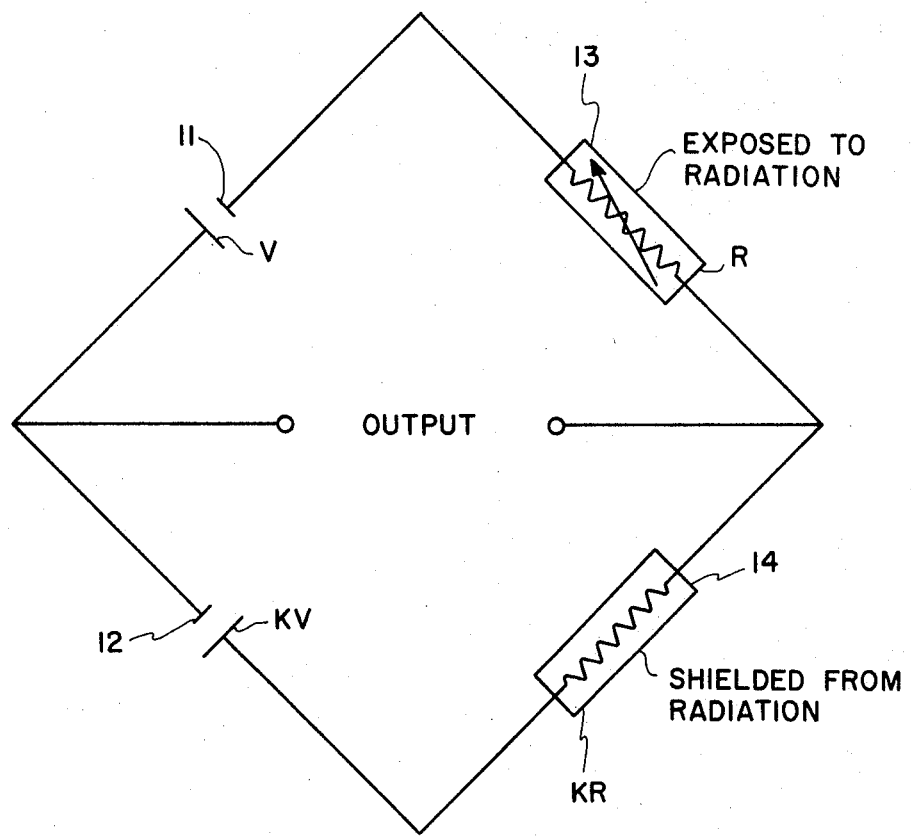
INVENTOR.
ANTONY JALINK, JR.
BY
William H. King
ATTORNEYS

METHOD FOR IMPROVING THE SIGNAL-TO-NOISE RATIO OF THE WHEATSTONE BRIDGE TYPE BOLOMETER

The invention described herein was made by an employee of the United States Government and may be manufactured and used by or for the Government for governmental purposes without the payment of any royalties thereon or therefor.

The invention relates generally to an instrument for measuring radiant energy and more specifically concerns means for improving the signal-to-noise ratio of the Wheatstone bridge type bolometer.

A bolometer is an instrument for measuring radiant energy. It depends for its operation on the change in resistance of a piece of material caused by the heating effect of the radiation being measured. The typical form of the bolometer consists of two of these pieces of material placed in two legs of a Wheatstone bridge. One is exposed to the radiation being measured and the other is shielded from the radiation, and serves to compensate for changes in the ambient temperature of the bolometer. This type of bolometer will measure small amounts of radiation. However, it is limited as to the smallness of the amounts of radiation it can measure by the thermal noise generated in the two pieces of material. The limiting value of the amounts of radiation that can be measured is determined by the signal-to-noise ratio at the output of the bolometer.

It is therefore the primary object of this invention to increase the signal-to-noise ratio at the output of a Wheatstone bridge type bolometer.

Other objects and advantages will become apparent hereinafter and in the drawing in which the single FIGURE is a schematic drawing in the invention.

Turning now to the embodiment of the invention selected for illustration in the drawing, the numbers 11 and 12 designate batteries. Battery 11 produces $V$ volts and battery 12 produces $KV$ volts, where $K$ is some large number. The larger $K$ is, the more the signal-to-noise ratio is improved. However, there is some improvement as long as $K$ is greater than one. The number 13 designates a piece of semiconductor material with resistance $R$ that has a negative temperature-resistance characteristics. Materials suitable for this use are well known in the bolometer art. There are many materials that would be suitable for this use and it is not intended that this invention be restricted to any one of them. It is only necessary that the material should be of a type that changes in resistance as its temperature changes. It is not even necessary that the material be restricted to a semiconductor; however, semiconductor materials are preferable since they are more sensitive. The number 14 designates a piece of material identical to piece 13 except that its resistance is $K$ times as large. Hence, the piece of material 14 has a resistance $KR$. Pieces 13 and 14 are located close to each other so that their surrounding temperatures are the same. Batteries 11 and 12, and pieces 13 and 14, are connected in a Wheatstone bridge as shown in the FIGURE. During operation, piece 13 is exposed to the radiation being measured and piece 14 is shielded from the radiation. The output of the bridge is proportional to the radiation.

The radiation measuring instrument shown in the FIGURE is old when $K$ is equal to one. This invention consists of making $K$ larger than one. By doing this, the signal-to-noise ratio of the instrument is increased and smaller amounts of radiation can be measured. The discussion in the following paragraphs shows that when $K$ is large the signal-to-noise ratio is increased over the case when $K$ is one.

It is well known that the thermal noise generated in any resistance is proportional to the square root of the magnitude of the resistance. Hence, for the case when $K$ is equal to one, pieces 13 and 14 are connected in parallel and their combined resistance is equal to $R/2$, so that the thermal-noise voltage ($N_1$) is proportion to the square root of $R/2$. The signal output ($S_1$) is $$S_1 = \frac{eV}{2R + e}$$

where $e$ is the incremental change in resistance of piece 13 due to the radiation being measured. Since $e$ is small compared to $R$ the signal output is approximately $$S_1 = \frac{eV}{2R}$$

Thus the signal-to-noise ratio for the case when $K$ is equal to one is proportional to $$\frac{S_1}{N_1} = \frac{\frac{eV}{2R}}{\sqrt{R/2}} = \frac{eV}{\sqrt{2}R^{3/2}}$$

For the case when $K$ is many times greater than one, the combined resistance of pieces 13 and 14 is approximately equal to $R$. Hence, the thermal-noise voltage ($N_k$) is approximately proportional to the square root of $R$. The signal output ($S_k$) is $$S_k = \frac{KeV}{(K+1)R + e}$$

Since $e$ is small compared to $R$ and $K$ is large the signal output is approximately $$S_k = \frac{eV}{R}$$

Therefore, the signal-to-noise ratio is proportional to $$\frac{S_k}{N_k} = \frac{\frac{eV}{R}}{\sqrt{R}} = \frac{eV}{R^{3/2}}$$

Comparing $S_k/n_k$ to $S_1/N_1$ it is readily seen that by making $K$ large the signal-to-noise ratio is increased by approximately a factor of 2.

The advantage of this invention is obvious in that it provides an instrument which will measure radiation that would be overridden by the thermal noise generated in the resistance of like prior instruments. Even though the thermal noise of the instrument, that constitutes this invention, increases when the resistance in one of its legs increases the signal output increase a larger amount. Hence, there is an overall increase in signal-to-noise ratio. Also the output signal is more nearly linear as piece 13 changes in resistance.

I claim:

1. A method for improving the signal-to-noise ratio of an instrument for measuring radiation of the type in which a first piece of material that changes in resistance when it is exposed to radiation, a second piece of material exactly like said first piece, a first battery, and a second battery that produces the same number of volts as said first battery are connected as a Wheatstone bridge whereby when said first piece of material is exposed to the radiation to be measured and the second piece is shielded from the radiation the output of the bridge is proportional to the radiation said method comprising the steps of replacing said second piece of material with an identical piece of material except that its resistance is $K$ times as large and replacing said second battery with a battery that produces $K$ times as many volts where $K$ is greater than one.